(12) United States Patent
Hill et al.

(10) Patent No.: US 8,925,400 B2
(45) Date of Patent: Jan. 6, 2015

(54) INSTRUMENTED FOAM PIG

(75) Inventors: Rennie Hill, Bedlington Northumberland (GB); David Thompson, Cramlington Northumberland (GB); Peter Ward, Cramlington Northumberland (GB)

(73) Assignee: Pipeline Innovations Limited, Ashington Northumberland (GB)

( * ) Notice: Subject to any disclaimer, the term of this patent is extended or adjusted under 35 U.S.C. 154(b) by 183 days.

(21) Appl. No.: 13/512,685

(22) PCT Filed: Nov. 30, 2010

(86) PCT No.: PCT/GB2010/051988
§ 371 (c)(1),
(2), (4) Date: Aug. 2, 2012

(87) PCT Pub. No.: WO2011/064603
PCT Pub. Date: Jun. 3, 2011

(65) Prior Publication Data
US 2012/0291569 A1 Nov. 22, 2012

(30) Foreign Application Priority Data
Nov. 30, 2009 (GB) .................................. 0920900.8

(51) Int. Cl.
*F16L 55/26* (2006.01)
*F16L 55/28* (2006.01)
*F16L 55/40* (2006.01)

(52) U.S. Cl.
CPC ........ *F16L 55/28* (2013.01); *F16L 55/40* (2013.01)
USPC ........................................................ 73/865.8

(58) Field of Classification Search
CPC .................... G01N 2291/2636; G01N 29/265
See application file for complete search history.

(56) References Cited

U.S. PATENT DOCUMENTS

| 4,091,678 | A | * | 5/1978 | Potter ......................... 73/865.8 |
| 4,227,309 | A | * | 10/1980 | Jones .............................. 33/544 |
| 4,443,948 | A | * | 4/1984 | Reeves ......................... 33/544.3 |
| 4,638,307 | A | * | 1/1987 | Swartout ....................... 340/666 |
| 5,088,336 | A | * | 2/1992 | Rosenberg et al. .......... 73/865.8 |

(Continued)

FOREIGN PATENT DOCUMENTS

| DE | 2554388 A1 | 6/1976 |
| EP | 0051912 A1 | 5/1982 |
| GB | 2295876 A | 6/1996 |

OTHER PUBLICATIONS

International Search Report, Application No. PCT/GB2010/051988 dated Apr. 27, 2011.

(Continued)

*Primary Examiner* — Hezron E Williams
*Assistant Examiner* — Mark A Shabman
(74) *Attorney, Agent, or Firm* — MacMillan, Sobanski & Todd, LLC

(57) ABSTRACT

An instrumented pig comprises a foam body having an outer surface and an inner cavity in which, in use, is located a sealed unit housing at least a part of a parameter measurement apparatus configured to measure at least one parameter from which the extent of deflection of the outer surface of the foam body may be derived, the sealed unit including at least one sensor configured to generate an output signal representative of the at least one measured parameter.

20 Claims, 13 Drawing Sheets

(56) References Cited

U.S. PATENT DOCUMENTS

| | | | |
|---|---|---|---|
| 5,659,142 A * | 8/1997 | Lima et al. | 73/865.8 |
| 6,857,329 B2 * | 2/2005 | Savard | 73/865.8 |
| 2003/0029256 A1 | 2/2003 | Savard | |
| 2004/0134289 A1 * | 7/2004 | Savard | 73/865.8 |
| 2008/0141474 A1 * | 6/2008 | Kapustin et al. | 15/104.066 |

OTHER PUBLICATIONS

Patent Act 1977: Search Report under Section 17(5), Application No. GB0920900.8 dated Dec. 16, 2010.

* cited by examiner

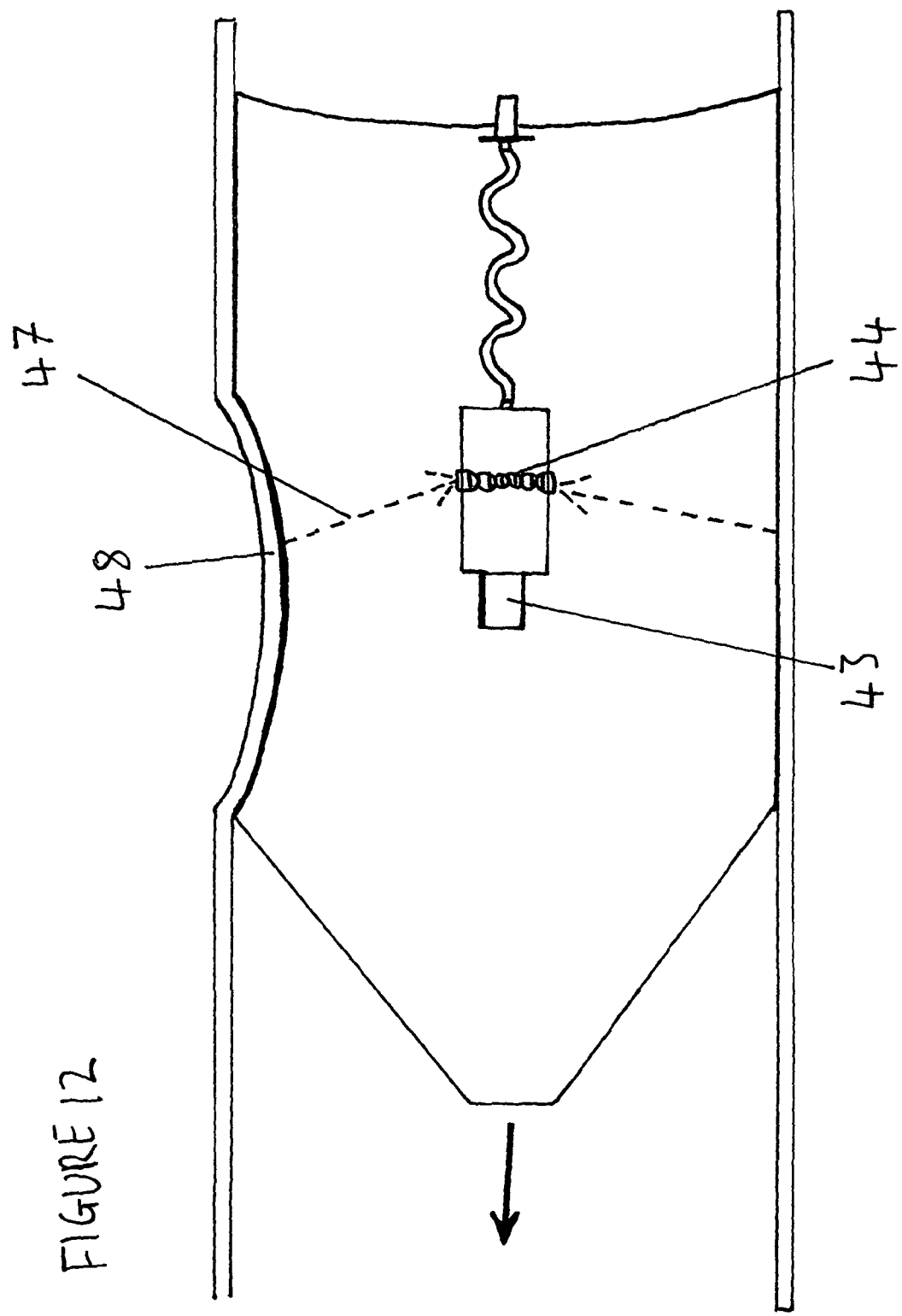

INSTRUMENTED FOAM PIG

FIELD OF THE INVENTION

The present invention relates to foam pigs of the type used to test pipelines for obstructions or damage, and in particular to such a pig that is instrumented.

CROSS-REFERENCE TO RELATED APPLICATIONS

This application is the National Phase of International Application PCT/GB2010/051988 filed 30 Nov. 2010 which designated the U.S. That International Application was published in English under PCT Article 21(2) on 3 Jun. 2011 as International Publication Number WO 2011/064603 A1. PCT/GB2010/051988 claims priority to U.K. Application No. 0920900.8, filed 30 Nov. 2009. Thus, the subject nonprovisional application also claims priority to U.K. Application No. 0920900.8, filed 30 Nov. 2009. The disclosures of both applications are incorporated herein by reference.

BACKGROUND OF THE INVENTION

Pipelines used for the transmission of oil and gas (and other fluids) need to be inspected. This may be immediately after construction or at periodic intervals thereafter. During the construction phase an obstruction in a pipeline may occur for any number of reasons. The pipeline may have received a blow externally from a machine for example, producing a dent extending into the pipe, a tool may have been left inside the pipe by a worker, excess sealant used at pipe joints may not have been properly removed, etc.

Pipelines are usually subjected to detailed gauge mapping before they are commissioned. However, a pig of this type is constructed with a metal body which may become stuck if it encounters an obstruction in the pipeline. To avoid the gauge pig becoming stuck, it is common practice to send a flexible foam pig through the pipeline first which can squeeze past obstructions much more easily. The foam pig is usually propelled through the pipeline by water. If the pig encounters an obstruction, the pig will in general be forced past the obstruction with and be damaged. If the foam pig exits the pipeline in a damaged condition, the operators know that it is not safe to deploy a (gauge) pig. Instead they would deploy further foam pigs to attempt to clean the line and remove obstructions until the foam pigs emerge from the line undamaged.

Pipelines are used to transport many different types of fluids including oil, gas, water, chemicals, slurries and food products. In order to operate efficiently, it is important that the bore of the pipeline does not become restricted either due to mechanical damage to the pipe wall or due to deposits building up on the inside of the pipeline. Even relatively small reductions in the bore, caused by deposits spread along the length of a pipeline, may have a significant effect on the flow of the product and the pumping efficiency. For this reason, cleaning pigs are used to remove deposits from the line. The pigs are in the form of a plug and they are pushed through the line by the product flow. The pig scrapes the deposits from the pipe wall and the particles are entrained by the flow of the product and pushed along by the pig to the end of the pipeline where they are removed by filters. In some pipelines, the cleaning process is carried out on a routine basis (say every week) and in others the operator will only use a cleaning pig when there is a noticeable fall in the pumping efficiency of the line. Typically, pigs are run through the line repeatedly until the product runs clean with no particles in the flow ahead of the pig. In all cases, the pipe is considered to be clean when this condition is reached.

Different types of pigs may be used during the cleaning process in order to avoid the possibility of a pig getting stuck. On the first run of a pig in the line, the degree of blockage of the line may be unknown and, therefore, early runs are carried out using very flexible foam pigs which are able to get through severe restrictions in the line. Once foam pigs are able to get through the line without damage or without too great a pumping pressure being required, then it is assumed that there are no major restrictions in the line and/or the quantity of deposits is not too great. At this point metal bodied pigs with plastic drive discs are used, which are more aggressive in removing deposits from the pipe wall. Finally, metal bodied pigs with brushes or metal scrapers may be used depending on the hardness and adhesion of the deposits.

In the oil and gas industry, the cleaning of pipelines is normally carried out 'blind' with no measurements being carried out to determine the nature and location of the blockage in the line or the thickness and the distribution of the deposits. As a result, the cleaning process must be carried out in a very cautious way, with multiple runs of foam pigs and a gradual progression to metal bodied pigs, with increasingly aggressive configurations. This approach can lead to significant inefficiencies in the cleaning process, with large numbers of cleaning runs being required and many of them possibly being unnecessary. It is proposed that a pig which can be used to measure the pipe bore, both at the start and during the cleaning process, could provide information to optimise the selection of the appropriate type of pig to be run in the line, at each stage in the process.

Instrumented pigs, which can measure and gauge the internal bore of a pipeline, are available and are commonly used in the oil and gas industry. These pigs have arrangements of sensors, transducers, and electronics to measure the internal bore of the pipeline and, by calibrating the systems, they are able to identify and measure changes in the pipe diameter. They also identify and measure features such as dents, ovality, and buckles, which may affect the integrity and operating performance of the pipeline. Typically, the product flow is used to push the pigs along and measurements are taken at frequent intervals, as the pigs are transported down the line. Measurement data are captured using recording devices on the pig and, at the end of the run, the data can be downloaded from the pig for viewing and analysis. However, all instrumented bore measurement pigs are hard bodied and are considered to be too great a risk for running in a pipeline at the early stages of cleaning. This patent proposes a bore measurement pig, which has a foam pig body, with the sensing system integrated into the foam matrix. This ensures that the device can be used with minimum risk, at any stage in the cleaning process, and will provide the operator with detailed information on the nature and location of blockages, and the thickness and distribution of deposits in the line.

It is known to instrument a foam pig. U.S. Pat. No. 5,659, 142 describes a foam pig instrumented with pressure sensors. As the pig is caused to move along the pipeline a pressure log is recorded by a pressure sensor, which is housed in a cavity at the centre of the pig. The pressure sensor is part of a sealed unit also comprising a processor, a memory and a power source.

Whilst measuring pressure allows the position of an obstruction to be identified, relying on the measurement of pressure does not yield a great deal of information about the nature of the blockage. Also, some pipeline features, such as ovality, may not affect pressure. If the cross-sectional shape changes, without the cross-sectional area changing, there will be little effect on fluid pressure.

Ultrasonic sensing of pipeline geometry is known in the prior art. It has been shown to work very well as long as it is in a medium, e.g. water or other liquids, that have a predictable effect on the transmitted and reflected signal. In liquids that contain solids, gasses, or badly mixed phases, the transference of the signal through the medium can be unpredictable. This can cause confusion of the signal and severe measurement errors.

It would therefore be desirable to provide an instrumented foam pig that is capable not of not only measuring the position of obstructions, but also the position of changes in the shape of the pipeline, and also to yield more detailed information about the nature of obstructions and the size and shape of defects in the pipeline.

SUMMARY OF THE INVENTION

According to the invention there is provided an instrumented pig comprising a foam body having an outer surface and an inner cavity in which, in use, is located a sealed unit housing at least a part of a parameter measurement apparatus configured to measure at least one parameter from which the extent of deflection of the outer surface of the foam body may be derived, the sealed unit including at least one sensor configured to generate an output signal representative of the at least one measured parameter.

Preferably, the parameter measurement apparatus includes at least one magnet situated within the foam of the foam body and spaced apart from the sealed body, and wherein the sensor is a magnetic flux sensor, preferably a Hall effect sensor. With this sensor arrangement as the pig passes through a pipeline, any perturbation in the shape of the pipeline, be that through the pipeline itself being mis-shaped, or there being a foreign body attached to the inner surface of the pipeline, the outer surface of the foam body is caused to deflect. This deflection of the outer surface of the foam body causes compression of the foam body, with the result that a magnet mounted within the foam body moves towards the sensor as the perturbation is encountered by the pig, and away from the sensor as the perturbation is passed, thereby allowing the internal shape of the pipeline to be mapped. By a process of calibration, the distance moved by outer surface of the foam body away from its position of natural repose can be derived by establishing the distance moved by the magnet towards the sensor.

Advantageously, the centre axis of the sealed unit is substantially aligned with the centre line of the foam body.

The foam body may comprise foam cast into the shape of a cylinder. The foam may be open cell foam.

The foam body may comprise two different types of foam, each of differing densities. In a preferred embodiment of the invention the foam body comprises a first foam element of a first density and a second foam element of a second density, said first foam element including a cavity in which the second foam element is inserted, and the second foam element including a cavity in which the sealed unit is housed. Advantageously, the at least one magnet is situated between the first and second foam elements. Preferably, the second foam element is less dense than the first foam element. This provides the advantage that upon encountering a perturbation in the shape of the inner surface of the pipeline, the second foam element will be compressed more than the first foam element. This means that for a given size of perturbation of the pipeline shape, the magnet will move further towards the magnetic flux sensor than if the foam body were comprised of a foam of a single density, because in that embodiment, the foam located between the magnet and the outer surface would be compressed comparatively more than if the foam to the outside of the magnet were more dense than the foam to the inside thereof.

In a preferred embodiment of the invention the at least one magnet is arranged in the foam with its magnetic axis aligned to the radial axis of the foam body, and the corresponding at least one magnetic sensor is aligned such that its sensitive axis is also aligned to the radial axis of the foam body. The lines of magnetic flux pass from the north pole of the magnet around the edges of the magnet to the south pole. In a small area in the centre of the magnet the flux lines are perpendicular to the face of the magnet and aligned to the sensitive axis of the sensors. This arrangement can be used with two sensor magnet pairs or it can be used with multiple magnet sensor pairs. Radial compression of the foam due to a bore reduction will result in radial movement of the magnet towards the sensor resulting in an increased field strength at the sensor and hence increased output signal from the sensor.

In a preferred embodiment of the invention the magnetic North/South axes of magnets are aligned with the longitudinal axis of the foam body and the sensitive axes of sensors and are also aligned with the longitudinal axis of the foam body. In this arrangement, the sensitive axis of the sensor is aligned to the direction of the magnetic lines of flux passing from the North Pole of the magnet to the South Pole ensuring maximum coupling of the magnetic field to the sensor in each sensor/magnet pair. In the radial direction, the lines of flux become more dense the closer the sensor is to the magnet. Hence, radial compression of the foam due to a bore reduction will result in radial movement of the magnet towards the sensor resulting in an increased field strength at the sensor and hence increased output signal from the sensor.

In one embodiment of the invention the magnets are of a length comparable to the expected extent of longitudinal distortion of the foam body in use. By so specifying the length of the magnets, the length of the small area in the centre of the magnet over which the magnetic flux lines are aligned perpendicular to the face of the magnet and parallel to the sensor axis is increased and provided that the longitudinal movement of the magnet is not greater than the length of this area, then the output from the sensor will not change due to longitudinal distortion of the foam body and no error, or no significant error will be observed.

In an alternative embodiment of the invention a pair of sensors is associated with each magnet, wherein each sensor of the pair is positioned such that its sensitive axis is aligned asymmetrically with the sensitive axis of the other, and preferably substantially perpendicular to each other, advantageously, one in the plane of the longitudinal axis and one in the radial axis of the foam body.

By adding the sensor outputs from the sensor pair, the resultant field can be measured which eliminates the error due to the misalignment of the field and sensor.

In an alternative embodiment of the invention a group of at least three sensors is associated with each magnet. Preferaby, each sensor in the group is positioned such that its sensitive axis is aligned asymmetrically with the sensitive axis of the other sensors in the group and preferably perpendicular to each other. Advantageously, one sensor is positioned with its sensitive axis in the plane of the longitudinal axis, one sensor is positioned with its sensitive axis in the radial axis of the foam body and one sensor is positioned with its sensitive axis aligned to a tangent to any circle having its centre of origin on the axis of the pig body and that circle being aligned so that the alignment between the centre of origin of the circle and any point on the circumference of the circle is parallel to the plane of the radial axis of the foam body.

The sensors of the group of at least three sensors may be positioned with their sensitive axes at any angle relative to each other and/or the major axes of the pig that prove through calculation or trial and error that ameliorate a parameter of the signal received by the sensors, for example the amplitude of the signal, or the noise associated with the signal.

In another case embodiment, the sensitive axis of one sensor of the group is aligned with respect to one of the major axes of the foam body while the sensitive axes of other sensors are rotated away from the remaining axes.

In another embodiment of the invention the sensor is an ultra sound sensor. In this embodiment, the sealed unit includes at least one ultrasound transmitter and at least one ultrasound sensor. Advantageously, the sealed unit includes a plurality of ultrasound sensors. In this embodiment the time taken for an emitted ultrasound signal to be reflected is measured. The foam of the foam body provides a predictable medium through which the ultrasound signal is transmitted, even though the signal would be attenuated somewhat.

An advantage of using the time taken for an ultrasound signal to be reflected as the sensed parameter is that any axial deflection of the foam body should not affect the recorded time, whereas in the case of magnets and magnetic flux sensors, axial deflection of the foam body may result in misalignment of the magnet with respect to the magnetic flux sensor, which may introduce an error into the measured parameter.

In order to ensure that the ultrasound signal is transmitted through a medium having fixed and known properties, radial guides may be situated in the foam body. The radial guides lead the ultrasonic signal from the centre of the pig to the outer surface of the foam body and back again.

The radial guides may comprise a chamber. The radial guides may be fluid or gel filled. The chamber may be a flexible plastic, such as polythene.

The sealed unit may also include sensors configured to sense other parameters, for example, temperature and pressure. By sensing these parameters as the pig is passed through a pipeline, if the magnitude of any parameter is affected by temperature and/or pressure, with the information recorded a calibration correction can be made.

According to another aspect of the invention there is provided a process of acquiring information representative of the internal shape of a pipeline comprising the steps of passing an instrumented pig according to the invention through a pipeline and recording the distortion of the foam body of the pig during passage of said pig through the pipeline.

BRIEF DESCRIPTION OF THE DRAWINGS

In the drawings, which illustrate preferred embodiments of a foam pig according to the invention and are by way of example:

FIG. 12 shows the pig illustrated in FIG. 11 continuing to travel forwards after first encountering the dent illustrated in FIG. 11.

DETAILED DESCRIPTION OF THE PREFERRED EMBODIMENTS

Figure 1:
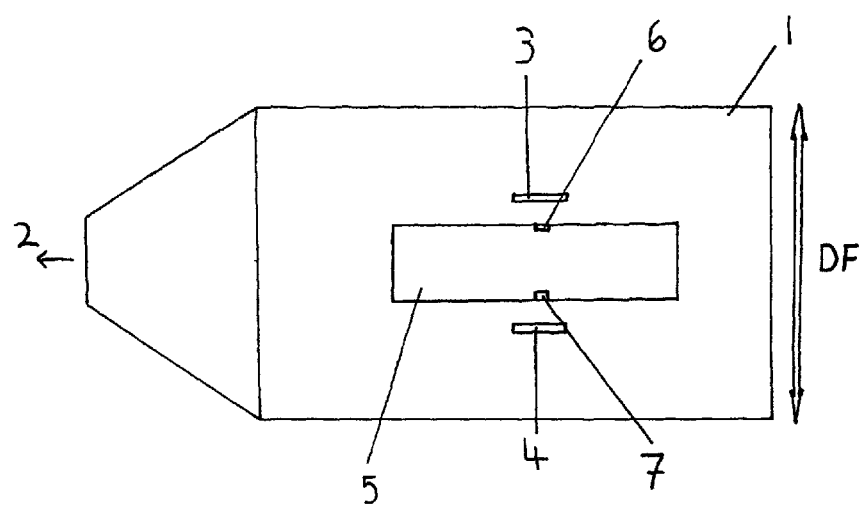
FIG. 1 is a schematic representation of a foam pig according to a first embodiment of the invention.

The first arrangement shown in FIG. 1 is suitable for measuring changes in the bore of the pipe where the changes are uniform such as changes in pipe wall thickness. FIG. 1 shows a pig comprising a foam body (1) of a typical design for use in cleaning and swabbing oil and gas pipelines. These pigs are commonly manufactured in sizes from 4" to 48" although other sizes can be produced. The foam body comprises open cell polyurethane foam cast into the shape of a cylinder with a conical nose cone. The outside diameter of the foam body (DF) is typically designed to be equal to the internal diameter of the pipeline. The direction of travel in the pipeline is shown by the arrow (2). Embedded in the foam matrix are two diametrically opposed magnets (3) & (4) equi-spaced about the axial centre line of the pig. The magnets are cast into the foam matrix in such a way that they move with the foam when the material is compressed or elongated.

Also moulded into the foam is a cylindrical housing (5), which is positioned so that the axial centre line of the housing is aligned with the axial centre line of the foam body. The housing is a pressure sealed container which is designed to protect the contents against the chemical and pressure effects of the product in the pipeline. The housing contains two magnetic sensors, (6) & (7) which are capable of detecting the magnetic field from the magnets embedded in the foam. The sensors are positioned diametrically opposite each other, close to the inner wall of the housing and in line with the magnets (3) & (4). Also contained in the housing but not shown are electronic circuits to capture and store the data from the sensors; and batteries to power the sensors and circuits.

Figure 2A:
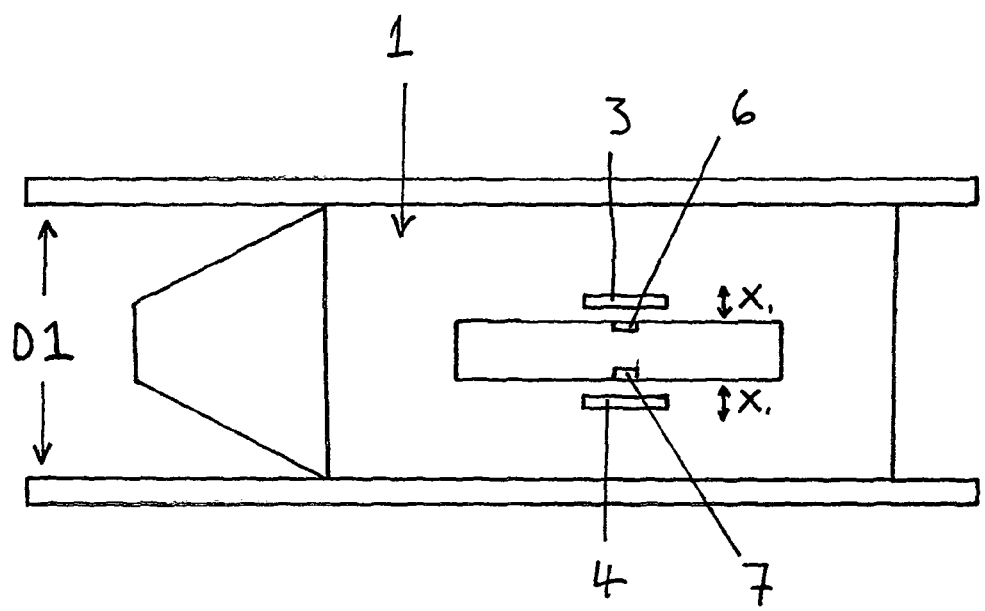
FIG. 2*a* is a schematic representation of the foam pig illustrated in FIG. 1 in a pipeline.

FIG. 2*a* shows the pig running in a normal bore pipe with no restrictions where the internal pipe diameter D1 is equal to the outside diameter of the foam body DF. The foam is uncompressed and the separation of the magnets (3) from the sensor (6) and the separation of the magnets (4) from the sensor (7) is the same and equal to X1.

Figure 2B:
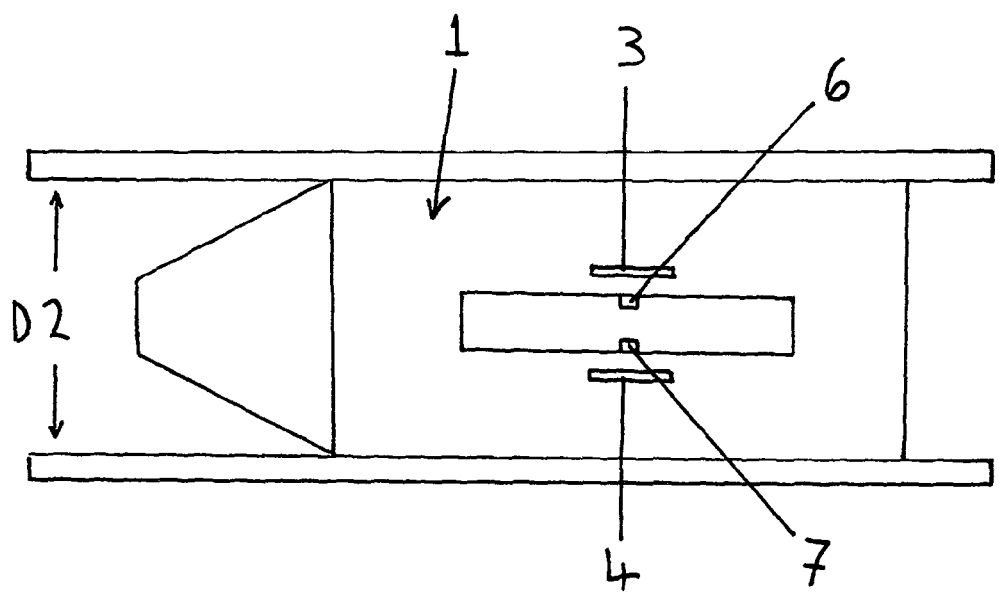
FIG. 2*b* is a schematic representation of the foam pig illustrated in FIG. 2*a* passing through a constriction in a pipeline.

FIG. 2*b* shows the pig in a restricted pipe bore where the internal diameter D2 of the pipe is less than the outside diameter DF of the foam body. In order to pass through this bore, the foam body must compress so that the outside diameter of the foam equals the inside diameter D2 of the smaller pipe. The foam is a compressible matrix and compression of the outside diameter of the foam results in compression of the matrix throughout the volume of the foam body. On compression of the outer surface of the foam, the polyurethane matrix is displaced inwards towards the centre line and the magnets embedded in the foam will move with the matrix. In the compressed state, the magnets (3) and (4) will be at a distance of X2 which is closer to the sensors (6) and (7) respectively than in the uncompressed state. The magnetic sensors (6) and (7) measure the strength of the field from the magnets and as the magnets move closer to the sensors the strength of the field increases and the output from the sensors will also increase.

For a given section of homogeneous foam, the displacement of points in that foam, when the whole section is compressed, is uniform throughout its thickness. The amount of radial displacement, at any point within the foam, being a function f(x) of its distance X from the point of minimum displacement relative to the point at which the compression is applied. In the instance of a foam pig body, the maximum displacement occurs on the outer surface and the minimum displacement on the axial centreline of the body. The amount of displacement at any point between the centre line and the outer surface will be dependent on many factors including, the formulation of the polyurethane material, the size and distribution of any voids, and the manufacturing processes used to make the pig. However, once a pig has been moulded, these relationships will be fixed and, for a specific pig, the function f(x) can be measured by calibration. Thus, for a given displacement of the outer surface of the foam body 1, the magnet positioned beneath that point on the surface will be radially displaced by an amount defined by the function f(x) resulting in a measurable change in output from the sensor. Thus a second function f'(x) can be determined relating the output from a sensor to the compression of the foam pig at a point on the outer surface, in-line with the sensor.

Once f'(x) has been determined for each sensor and magnet combination, then a calibration algorithm can be produced which enables the compression of the outer surface of the pig to be determined by measurement of the output from the sensor resulting from the displacement of the magnet embedded in the matrix.

Figure 3:
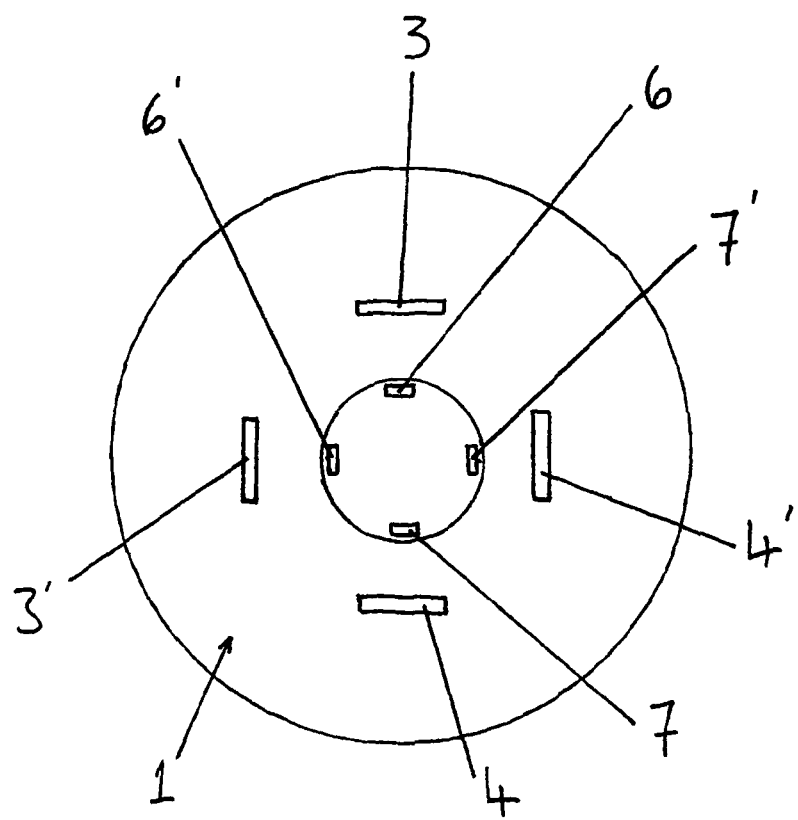
FIG. 3 is an end view of the foam pig illustrated in FIG. 1.

FIGS. 1 & 2 show an arrangement with two diametrically opposite magnets and sensors to measure the pipe bore. This arrangement is suitable for measuring uniform changes in the bore such as those which might result from changes in thickness of pipe wall material. In practice, many bore changes are non-uniform such as those resulting from mechanical damage to the pipeline (dents, ovality, buckles) or from the laying down of deposits on the pipe wall where more material may be deposited on the bottom of the pipe than on the top. For measurement of non-uniform bore changes, more measurement points are required and an arrangement with four magnets and four sensors as shown in FIG. 3 can be used. Additional magnet and sensor pairs can be added at intermediate angular positions to increase the circumferential resolution of the measurements.

In the arrangements shown in FIGS. 1, 2 and 3, the magnets embedded in the foam matrix can have rectangular or circular cross sections and the magnetised axis can be aligned to the longitudinal axis of the foam pig or aligned to the radial axis of the pig. The magnet sensors mounted adjacent to the magnet must be capable of measuring the static magnetic field from the magnet. These sensors would typically be Hall Effect sensors. Hall Effect sensors have a sensitive axis which, when aligned to the direction of the magnetic field, gives the maximum output and when aligned perpendicular to the magnetic field gives the minimum output. By aligning the sensitive axis of the sensor to the direction of the magnetic field, optimum coupling of the field to the sensor is achieved.

Figure 4:
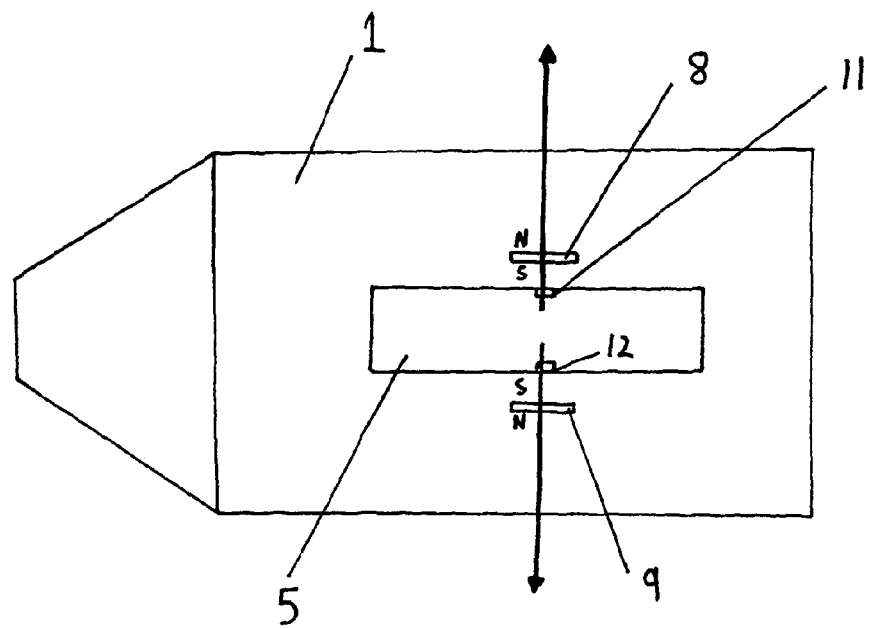
FIG. 4 is a schematic representation of the foam pig illustrated in FIG. 1 showing one arrangement of magnets and magnetic sensors.

The preferred arrangement shown in FIG. 4 uses magnets (8) & (9) with the magnetic axis aligned to the radial axis of the pig (10), and magnetic sensors (11 & (12) with the sensitive axis aligned in the same orientation (10). The lines of magnetic flux pass from the north pole of the magnet around the edges of the magnet to the south pole. In a small area in the centre of the magnet the flux lines are perpendicular to the face of the magnet and aligned to the sensitive axis of the sensors. This arrangement can be used with two sensor magnet pairs as shown in FIG. 4 or it can be used with multiple magnet sensor pairs. Radial compression of the foam due to a bore reduction will result in radial movement of the magnet towards the sensor resulting in an increased field strength at the sensor and hence increased output signal from the sensor.

Figure 5:
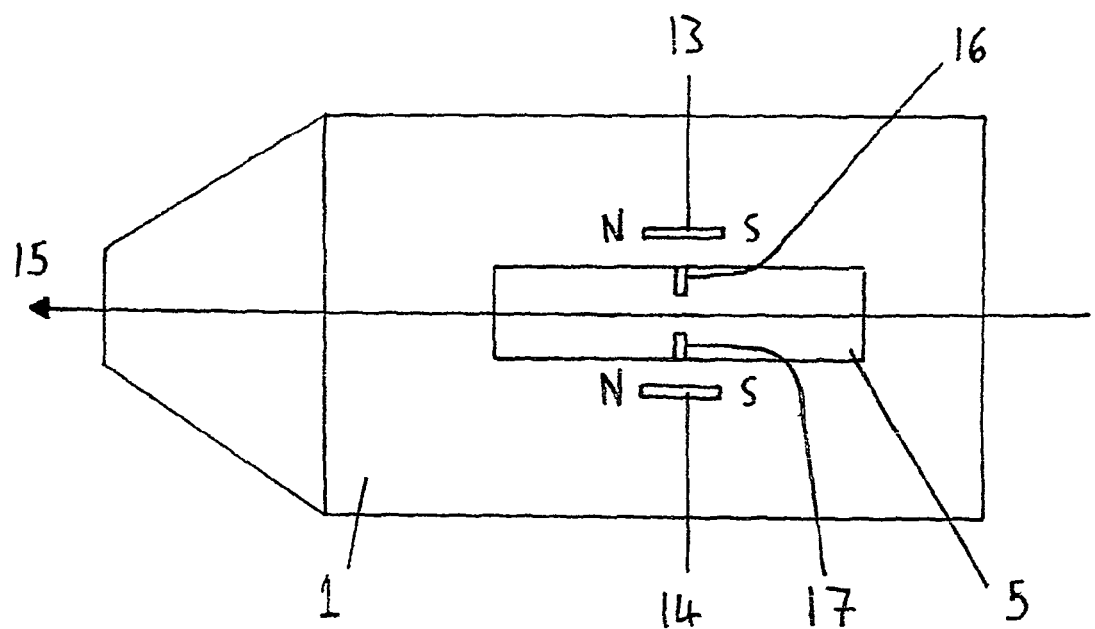
FIG. 5 is a schematic representation of the foam pig illustrated in FIG. 1 showing another arrangement of magnets and magnetic sensors.

An alternative arrangement is shown in FIG. 5 where the magnetic North/South axes of magnets (13) & (14) are aligned with the longitudinal axis (15) of the pig and the sensitive axes of sensors (16) and (17) are also aligned with the longitudinal axis (15) of the pig. In this arrangement, the sensitive axis of the sensor is aligned to the direction of the magnetic lines of flux passing from the North Pole of the magnet to the South Pole ensuring maximum coupling of the magnetic field to the sensor in each sensor/magnet pair. In the radial direction, the lines of flux become more dense, the closer the sensor is to the magnet. Hence, radial compression of the foam due to a bore reduction will result in radial movement of the magnet towards the sensor resulting in an increased field strength at the sensor and hence increased output signal from the sensor.

Figure 6:
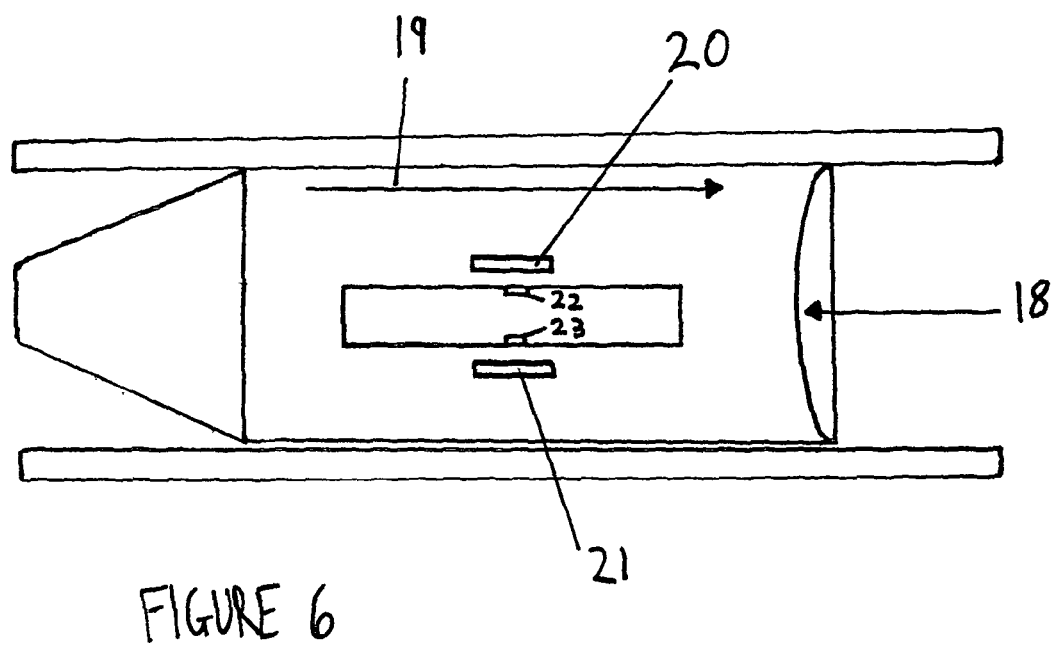
FIG. 6 is a schematic representation of the foam pig illustrated in FIG. 1 showing another arrangement of magnets and magnetic sensors.

In the ideal case, when the pig enters a reduced bore, the foam compresses in a radial direction, moving the magnet closer to the sensor and producing a greater output. This relationship can be calibrated allowing bore reductions to be estimated by measuring sensor outputs. However, in practice, the foam can be distorted in the longitudinal direction as it encounters larger bore reductions. This results from the mechanical forces acting on the pig as it is driven through the restriction in the bore. FIG. 6 shows the forces acting on the foam pig when being driven through a pipeline. The driving force is provided by the pressure (18), on the rear face of the pig, arising from the flow of the product in the line. Reacting against this is the frictional drag force (19) on the outer surface of the pig where it contacts the pipe wall. The two forces acting in opposition tend to generate a shear action resulting in the centre section of the pig being pushed forward and the outer surface being dragged backwards.

In small bore reductions, the shearing action is small and the foam compresses in a radial direction with very little distortion in the longitudinal direction. However, in large bore reductions, the drag forces on the outer skin of the foam against the pipe wall are much higher and the longitudinal distortion of the foam is greater. The effect of this is that in a large bore reduction the magnets (20) & (21) will move in a longitudinal direction relative to the sensors (22) & (23), moving the sensors away from the centre of the magnets. In the centre of the magnet, the field is aligned with the sensitive axis of the sensors but away from the centre of the magnet, the direction of the field changes and the coupling of the field to the sensor is reduced. This has the effect of reducing the sensor output, which counteracts the increase in sensor output due to the radial movement of the magnet, introducing errors in the measurement of the pipe bore.

One solution to this is to increase the longitudinal length of the magnets which increases the length of the small area in the centre of the magnet over which the magnetic flux lines are aligned perpendicular to the face of the magnet and parallel to the sensor axis. Providing the longitudinal movement of the magnet is not greater than the length of this area, then the output from the sensor will not change and no error will be observed.

Figure 7:
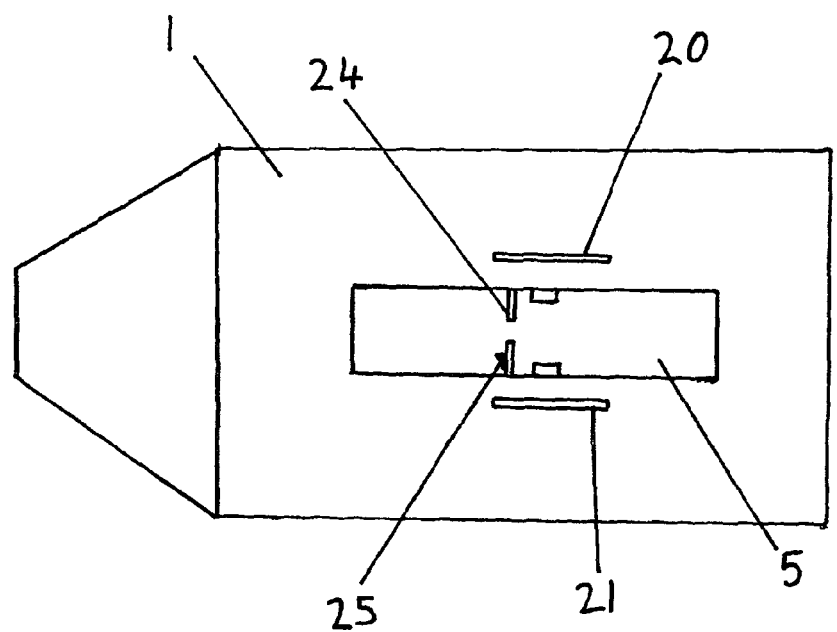
FIG. 7 is a schematic representation of the foam pig illustrated in FIG. 1 showing another arrangement of magnets and magnetic sensors.

Another solution shown in FIG. 7 is to replace the single sensors (22, 23) in FIG. 6, by sensor pairs (24, 25) aligned with sensitive axes at 90 degrees to each other in the plane of the longitudinal axis and the radial axis of the pig. By adding the sensor outputs from the sensor pair, the resultant field can be measured, which eliminates the error due to the misalignment of the field and sensor.

Figure 8:
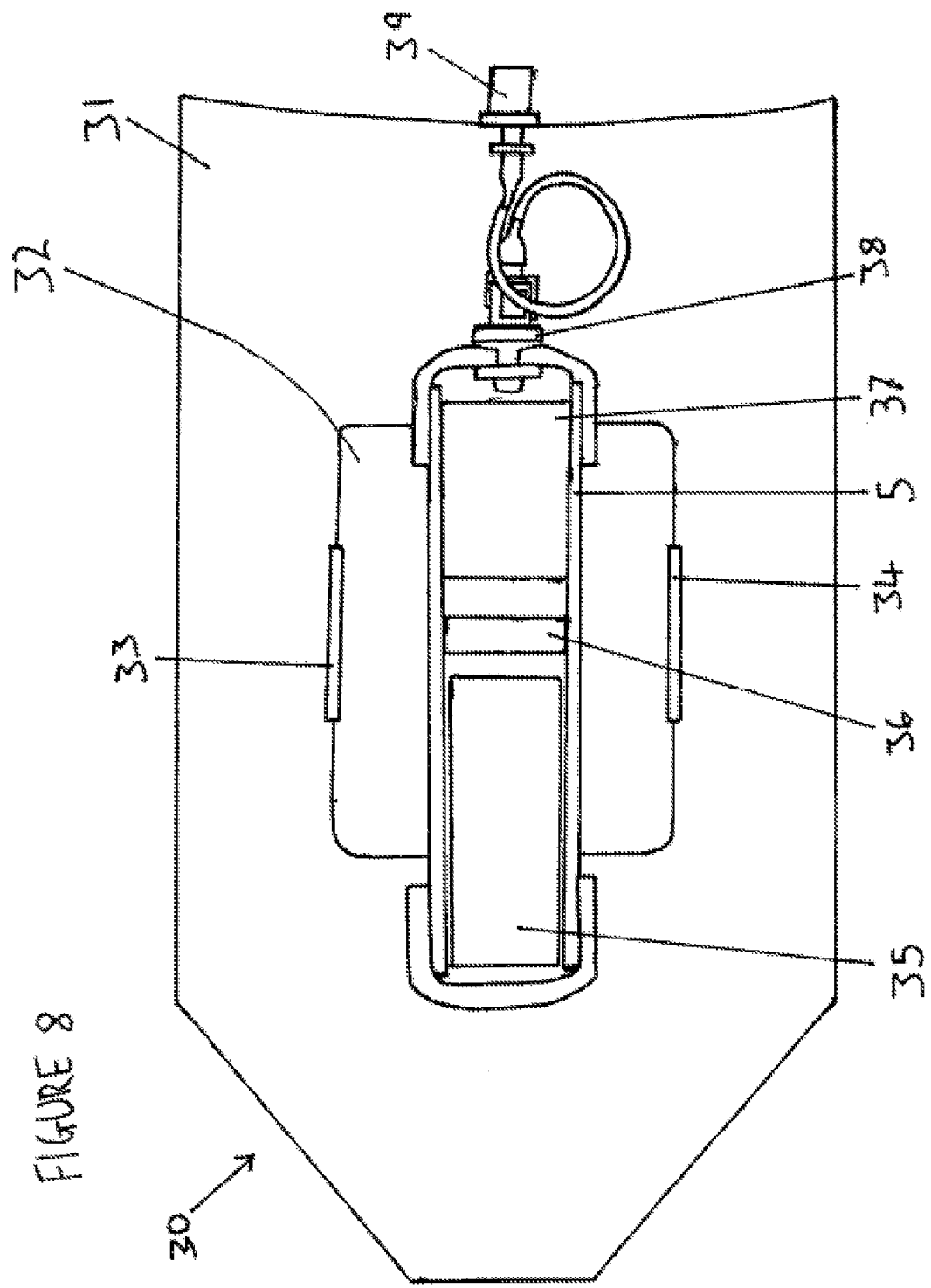
FIG. 8 is a schematic representation of a foam pig according to another aspect of the invention.

FIG. 8 illustrates an alternative form of pig, where the foam body is formed of first and second elements 31, 32. The first element 31 is formed of dense foam, whereas the second element 32 is formed of a less dense and hence softer foam. The magnets 33, 34 are located between the first and second elements 31, 32. By fabricating the foam body in first and second elements, a measurement with greater sensitivity may be made. As mentioned above, the compression of the foam is not uniform through the thickness of the body, the amount of compression being a function f(x) of the radial distance X from the centre line of the pig body. Maximum compression occurs on the outer surface of the body and minimum compression on the axial centre line of the body. By forming the second element of a less dense foam than the first element the second element is compressed comparatively more than the first element, and hence the magnet moves through a greater distance resulting in an output from the magnet sensor of greater magnitude.

In the housing 5 are situated a data logger 35, magnetic sensors 36 and batteries 37. At one end of the housing 5 there is mounted a plug 38, which is sealed against ingress of fluid. A further plug 39 may be attached to the plug 38 to export data from the housing 5.

The housing 5 contains a data logger, power source, and control circuitry to process the outputs from the magnetic sensors. This electronics package would run continuously, recording sensor values in non-volatile digital memory, e.g. a Flash card. Data could be off-loaded via a USB, or similar, interface.

FIGS. 9 to 12 illustrate an alternative embodiment of the invention, in which the deflection of the outer surface of the foam body is detected by measuring the time taken for an ultrasound wave to be reflected from the inner wall of the pipeline.

Figure 9:
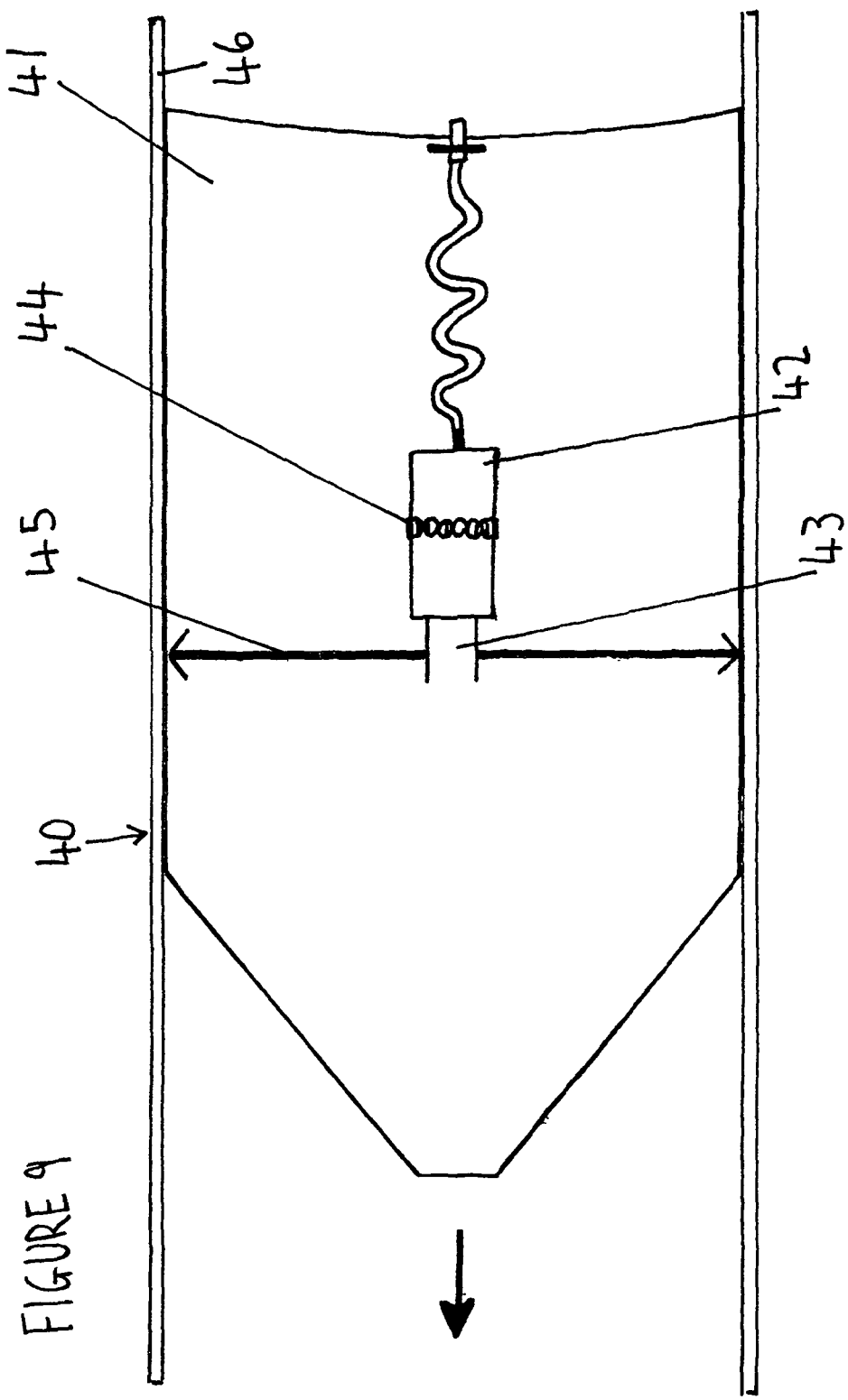
FIG. 9 is a schematic representation of an alternative embodiment of the invention with the pig travelling through a pipeline, which is in good condition.

In FIG. 9 a pig 40 is shown travelling in a direction through a pipeline, which is in good condition. The pig 40 comprises a foam body 41 in which is mounted a cylindrical housing 42. An ultrasonic transmitter 43 is mounted in the housing 42 and is shown sending out a pulse represented by the arrow 45 towards the pipe-wall 46.

Figure 10:
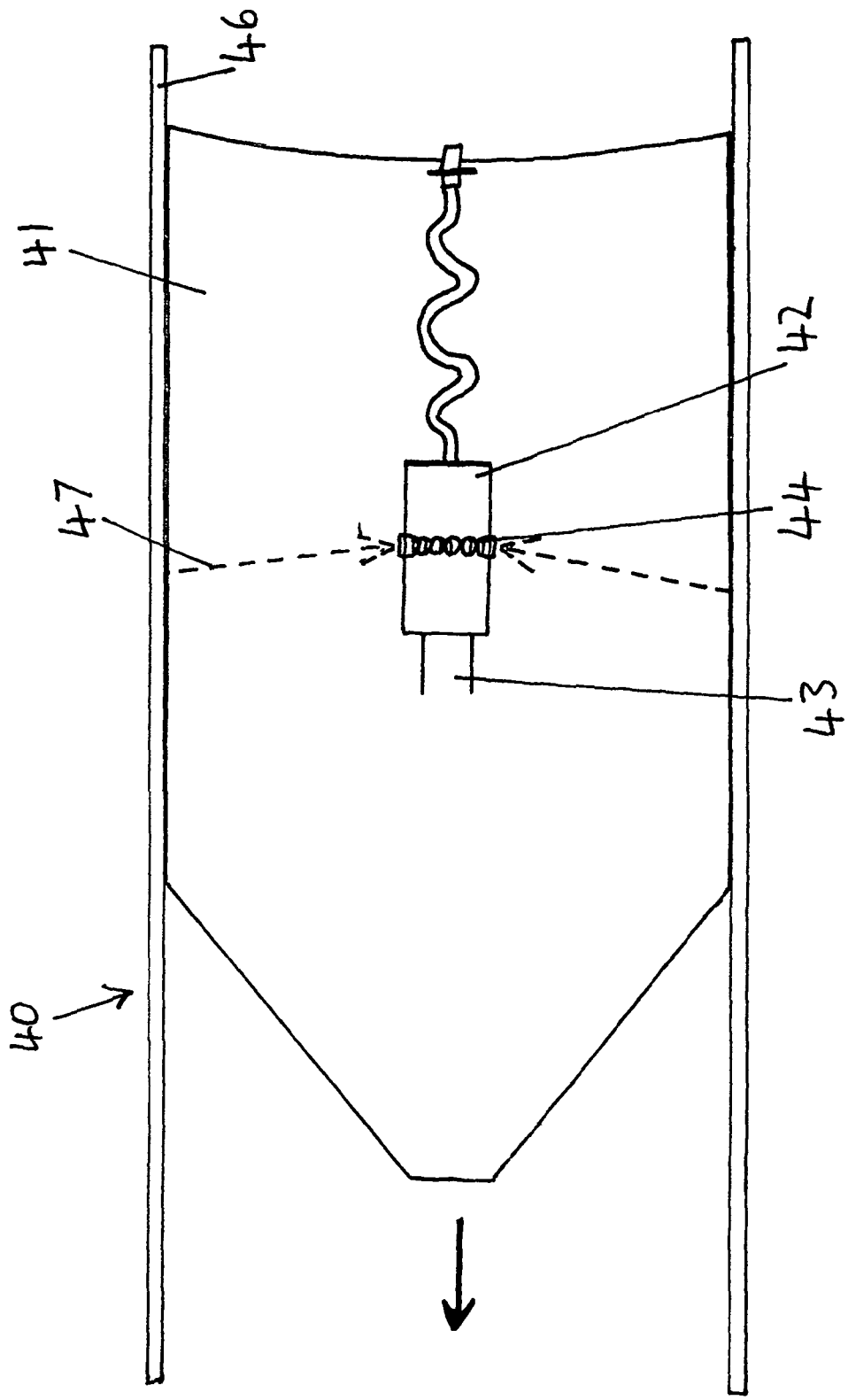
FIG. 10 shows the pig illustrated in FIG. 9 continuing to travel forward.

FIG. 10 shows the pig continuing to travel forwards and, this time, the attenuated signal, represented by the broken line 47, is bouncing back towards the array of receivers 44

Figure 11:
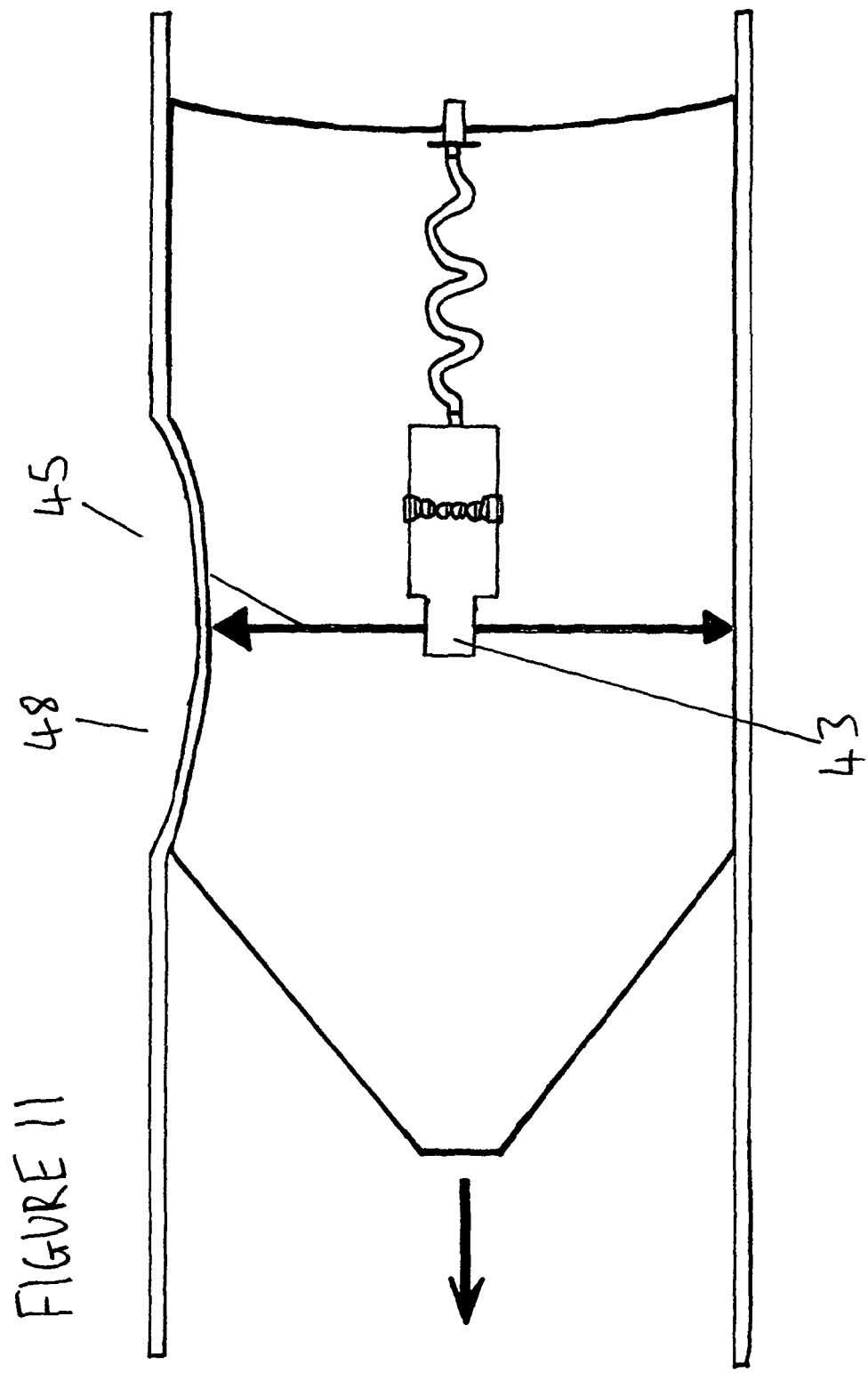
FIG. 11 shows the pig illustrated in FIGS. 9 and 10 when it encounters a dent in a pipeline.

FIGS. 11 and 12 show the same operation taking place as illustrated in FIGS. 9 and 10, only this time there is a dent 48 in the upper part of the pipe-wall 46. In the region of the dent 48 the time taken for the ultrasound pulse to reach the pipe-wall 46 and be reflected back to the ultrasonic receivers 44 is reduced.

An advantage of embedding an ultrasonic measurement system in a foam pig is that the foam attenuates the ultrasonic signal, to some extent, but the environment inside the pig is much more predictable than that of the pipeline medium. The mass of the foam is the same, whether or not it is compressed, and the major reflection should come from the inside of the pipe-wall.

The housing 42 contains a data logger, power source, and control circuitry to control the ultrasonic system and to process the outputs from the sensors. This electronics package would run continuously in a predetermined sequence of transmitting and receiving pulses and recording sensor values in non-volatile digital memory, e.g. a Flash card. Data could be off-loaded via a USB, or similar, interface.

The pigs illustrated in FIGS. 1 to 12 may also include sensors for sensing other variables, such as temperature and pressure. These variables would be stored in the data logger for subsequent use in correction during data analysis.

The invention claimed is:

1. An instrumented pig comprising:
a foam body having an outer surface and an inner cavity in which there is located a sealed unit housing at least a part of a parameter measurement apparatus that measures at least one parameter from which an amount of deflection of the outer surface of the foam body is derived,
wherein the sealed unit includes at least one sensor that generates an output signal representative of the at least one measured parameter.

2. An instrumented pig according to claim 1, wherein the parameter measurement apparatus includes at least one magnet situated within the foam of the foam body and spaced apart from the sealed body, wherein the sensor is a magnetic flux sensor.

3. An instrumented pig according to claim 2, wherein the sensor is a Hall effect sensor.

4. An instrumented pig according to claim 2, wherein the at least one magnet is arranged in the foam body with its magnetic North/South axis aligned to the radial axis of the foam body, and the corresponding at least one magnetic sensor is aligned such that its sensitive axis is also aligned to the radial axis of the foam body.

5. An instrumented pig according to claim 2, wherein the magnetic North/South axis of at least one magnet is aligned with the longitudinal axis of the foam body and the sensitive axes of at least one sensor is also aligned with the longitudinal axis of the foam body.

6. An instrumented pig according to claim 2, wherein the at least one magnet is of a length comparable to the expected extent of longitudinal distortion of the foam body in use.

7. An instrumented pig according to claim 2, comprising a pair of sensors is associated with each magnet, wherein each sensor of the pair is positioned such that its sensitive axis is aligned asymmetrically with the sensitive axis of the other.

8. An instrumented pig according to claim 7, wherein the sensitive axes of the sensors of the pair are aligned substantially perpendicular to each other.

9. An instrumented pig according to claim 8, wherein the sensitive axes of the sensors of the pair are aligned one in the plane of the longitudinal axis and one in the radial axis of the foam body.

10. An instrumented pig according to claim 1, wherein the foam body comprises two different types of foam, each of differing densities.

11. An instrumented pig according to claim 10, wherein the foam body comprises a first foam element of a first density and a second foam element of a second density, said first foam element including a cavity in which the second foam element is inserted, and the second foam element includes said inner cavity in which the sealed unit is housed.

12. An instrumented pig according to claim 11, wherein the parameter measurement includes at least one magnet is situated between the first and second foam elements, and wherein the sensor is a magnetic flux sensor.

13. An instrumented pig according to claim 11, wherein the first foam element is less dense than the second foam element.

14. An instrumented pig according to claim 1, wherein the sensor is an ultra sound sensor, and the sealed unit includes at least one ultrasound transmitter and at least one ultrasound sensor.

15. An instrumented pig according to claim 14, wherein the sealed unit includes a plurality of ultrasound sensors.

16. An instrumented pig according to claim 14, further including radial guides situated in the foam body and adapted to guide the ultrasonic signal from the centre of the pig to the outer surface of the foam body and back again.

17. An instrumented pig according to claim 1, wherein the axial centre line of the sealed unit is substantially aligned with the axial centre line of the foam body.

18. A process of acquiring information representative of the internal shape of a pipeline comprising the steps of:
passing an instrumented pig according to claim 1 through a pipeline, and
recording the distortion of the foam body of the pig during passage of said pig through the pipeline.

19. An instrumented pig comprising:
a foam body having an outer surface and an inner cavity in which there is located a sealed unit housing at least a part of a parameter measurement apparatus configured to measure at least one parameter from which the extent of deflection of the outer surface of the foam body may be derived, wherein
the sealed unit includes at least one sensor configured to generate an output signal representative of the at least one measured parameter,
the parameter measurement apparatus includes at least one magnet situated within the foam of the foam body and spaced apart from the sealed body, and
the sensor is a magnetic flux sensor.

20. An instrumented pig comprising:
a foam body having an outer surface and an inner cavity in which there is located a sealed unit housing at least a part of a parameter measurement apparatus configured to measure at least one parameter from which the extent of deflection of the outer surface of the foam body may be derived, wherein
the sealed unit includes at least one sensor configured to generate an output signal representative of the at least one measured parameter,
the sensor is an ultra sound sensor, and
the sealed unit includes at least one ultrasound transmitter and at least one ultrasound sensor.

* * * * *